United States Patent [19]

Oushiden et al.

[11] Patent Number: 4,641,953

[45] Date of Patent: Feb. 10, 1987

[54] IMAGE FORMING APPARATUS

[75] Inventors: Hideshi Oushiden, Kawasaki; Naoshi Obara, Yokohama, both of Japan

[73] Assignee: Kabushiki Kaisha Toshiba, Kawasaki, Japan

[21] Appl. No.: 615,278

[22] Filed: May 30, 1984

[30] Foreign Application Priority Data

May 31, 1983 [JP] Japan .................................. 58-96124

[51] Int. Cl.[4] ...................... G03G 15/00; G03B 27/52

[52] U.S. Cl. .................................... 355/14 R; 355/55; 355/57

[58] Field of Search ....................... 355/56, 57, 60, 66, 355/8, 14 C, 14 R, 55

[56] References Cited

U.S. PATENT DOCUMENTS 4,095,880 6/1978 Shogren et al. ........................ 355/8
4,332,464 1/1982 Bartulis et al. .................... 355/14 C
4,543,643 9/1985 Shibazaki et al. ...................... 355/55

FOREIGN PATENT DOCUMENTS 2087577 5/1982 United Kingdom .............. 355/14 C

*Primary Examiner*—L. T. Hix
*Assistant Examiner*—D. Rutledge
*Attorney, Agent, or Firm*—Cushman, Darby & Cushman

[57] ABSTRACT

A copying apparatus comprises specified magnification ratio setting keys for setting specified magnification ratios and magnification ratio increasing and decreasing keys for setting a desired magnification ratio. The magnification ratio is defined as the ratio in size of the copied image with respect to the document to be copied.

3 Claims, 9 Drawing Figures

IMAGE FORMING APPARATUS

BACKGROUND OF THE INVENTION

The present invention relates to an image forming apparatus and, more particularly, to an image forming apparatus capable of changing a magnification ratio of an image to be formed.

Most of the recently developed image forming apparatuses, for example, copying apparatus, have the functions of reducing and enlarging the size of an image of a document when the document is copied. Principles of the copying apparatus will briefly be described referring to FIG. 1. In operation, a document 0 to be copied is set on a document supporting table 1. The document set on the table 1 is optically scanned by a scanning device including an exposure lamp 2 and a mirror 3. The reflected light beams from the document 0 are introduced onto the surface of a rotating photosensitive drum 8, which is uniformly charged, through an optical system including mirrors 4 and 5, a lens 6 and a mirror 7. The image of the document 0 is formed onto the drum surface, in the form of a latent image. The latent image thus formed is developed with toners into a visual image. The visual image of the toners is then transferred onto a copying sheet and fixed thereon. The above procedure of operation forms one cycle of the copying operation of the copying apparatus.

A size ratio of the image formed on the drum surface to the size of the document, i.e., a magnification ratio (MR), depends on a speed ratio and an optical path length ratio. The speed ratio means a ratio of the rotating speed of the drum 8 to the scanning speed with which the document 0 is optically scanned by the scanning device. The optical path length ratio means a ratio of the optical path length from the lens 6 to the drum surface to the optical path length from the document 0 to the lens 6. The speed ratio determines a magnification ratio in the scanning direction. The optical path length ratio determines a magnification ratio in the direction perpendicular to the scanning direction in the scanning plane. This technique to control a magnification ratio by changing the speed ratio and the optical path length ratio is already been known.

A continuous change of the speed ratio and the optical path length ratio requires a considerably complicated mechanism. Therefore, in the conventional copying apparatus the magnification ratio is limited to some specific ones, and is not continuously changed. This is a compromise measure and unsatisfactory for the user for the following reasons. The very limited number of magnification ratios of the conventional copying apparatus also limits the sizes of copying sheets available for the copying apparatus to some specific ones. As a result, the following undesirable situation naturally occurs. In copying a document of a size other than the copying sheet size especially specified, the document is incompletely copied on the sheet having the specified size in a reduction mode. In this case, part of the document image does not appear on the copying sheet. When using a copying sheet having another specified size, the same phenomenon occurs in an enlargment mode. For securing the copy of a complete image of the document, the copying apparatus must be set to a reduction mode having an extremely small magnification ratio. As described above, in the conventional copying apparatus, it was difficult to use the total area of a copying sheet to form an image of a document.

SUMMARY OF THE INVENTION

Accordingly, an object of the present invention is to provide an image forming apparatus which is capable of forming an image at a desired magnification ratio.

An image forming apparatus according to the present invention comprises: an optical means for optically scanning a document and transmitting light beams from the document so as to form an optical image of the document; magnification ratio setting means for setting a magnification ratio in size of the optical image with respect to the document; and control means for controlling the optical means in such a manner that the optical image with the magnification ratio set by the magnification ratio setting means is projected on a photosensitive medium. The magnification ratio setting means comprises a first magnification ratio setting means which includes at least one magnification ratio setting key for setting a specified magnification ratio, and a second magnification ratio setting means which includes a magnification ratio increasing key and a magnification ratio decreasing key, each key being used for setting a desired magnification ratio. The control means controls the optical means in such a manner that an optical image having a magnification ratio set by using the first magnification ratio setting means, by using the second magnification ratio setting means or by using the first and second magnification ratio setting means, is projected on the photosensitive medium.

DESCRIPTION OF THE PREFERRED EMBODIMENT

Figure 1:
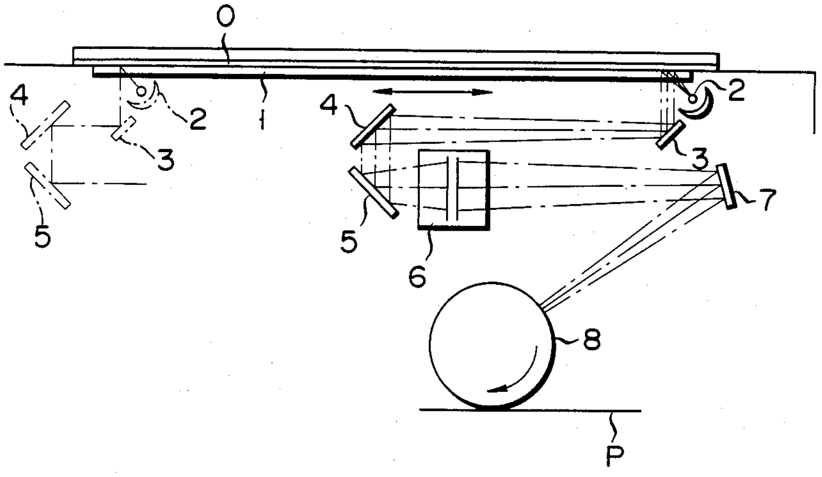
FIG. 1 shows a schematic illustration illustrating the principles of a copying apparatus.
Figure 2:
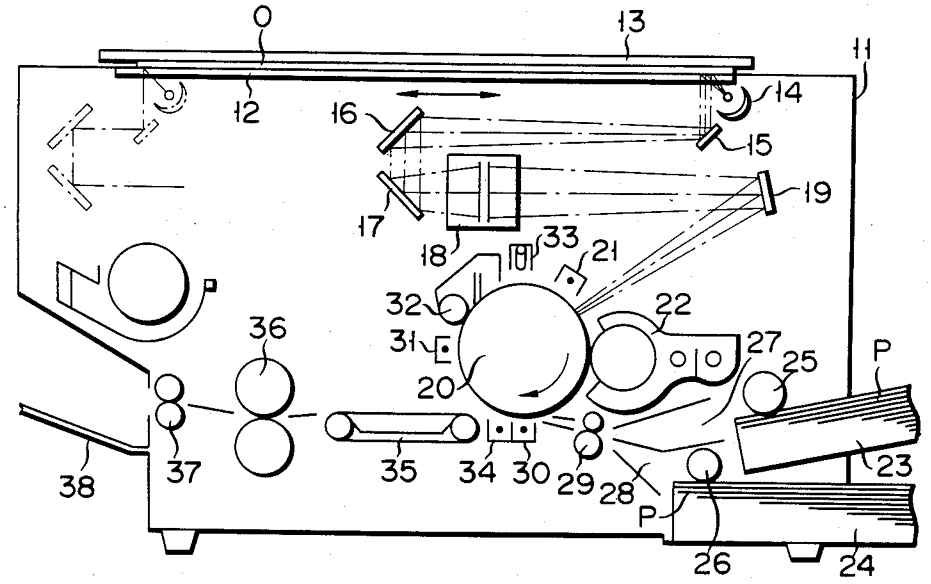
FIG. 2 shows a longitudinal schematic illustration of a copying apparatus according to the present invention.

In FIG. 2, a document supporting table (transparent glass plate) 12 for supporting a document 0 to be copied is provided on the top of a main frame 11 of a copying apparatus. A cover 13 is removably provided on the document supporting table 12. An optical system including an exposure lamp 14 and mirrors 15–17 is located under the document supporting table 12 and in the upper portion of the space within the main frame 11. The optical system is reciprocally moved in the direction of the arrow for optically scanning the document. To keep the optical path from the document to a lens 18 at a fixed length, the mirrors 16 and 17 are driven at half the speed of the mirror 15. The light beam from the lamp 14 hits the document 0, is reflected, is then reflected successively by the mirrors 15–17, passes a lens 18, is again reflected by the mirror 19, and is finally projected, through a slit (not shown), onto the surface of a photosensitive drum 20 rotating in the direction of the arrow. With the rotation of the photosensitive drum 20, the light beam depicts a document image on the drum surface. The drum surface is charged by a first charger 21, while the photosensitive drum is rotating. The image depicted through the slit onto the charged drum surface, forms an electrostatic latent image on the drum surface. The electrostatic latent image to be developed into a visual image attracts toner applied by a developer 22.

Upper and lower cassettes 23 and 24 for storing piled copy sheets or papers are removably set in the lower right corner portion of the main frame 11. Papers are taken out sheet by sheet from either of the cassettes 23 or 24. The paper is guided through a corresponding guide path 27 or 28 to a pair of registration rollers 29. With rotation of the pair of registration rollers, the paper P is transported to a transcribing portion of the drum 20. The paper P closely contacts the surface of the drum 20 at the location of a second charger or a transcribing charger 30 in the transcribing portion. At this time, the transcribing charger 30 applies charges to the paper P. The charged paper P attracts toners patterned in the form of the visible image on the drum surface. The paper P with the toner image is charged by a third charger or a paper separating charger 34, and is separated from the drum surface. The separated paper P is transferred through a paper transfer path 35 to a pair of heating rollers 36. When the paper P passes through the pair of heating rollers 35, the toner image is heated and fixed on the paper P. The paper P with the fixed toner image is driven and discharged into a tray 38 by an exit roller pair 37. A fourth charger or a charge removing charger 31 removes residual charges on the drum surface of the rotating photosensitive drum 20 when the drum surface passes the charge removing charger 31. Further, a cleaner 32 provided further down from the charge removing charger 31 cleans the drum surface. A charge removing lamp 33 removes a residual latent image. In this way, the drum surface returns to its initial state.

The description to follow is how to operate the above-mentioned copying apparatus in a reduction mode for copying a document 0 into a size-reduced image and in an enlargement mode for copying the document 0 into a size-enlarged image. The image forming apparatus in this embodiment is provided with a means for setting at least one specified magnification ratio, and a means for setting a desired magnification ratio by increasing or decreasing a magnification ratio. The control of the magnification ratio would be realized by controlling the optical system of the copying apparatus in response to the magnification ratio set. To be more specific, motions of related optical elements in the optical system and a rotating speed of the photosensitive drum 20 are controlled so that an image formed on the drum surface has a desired magnification ratio. As already described, a magnification ratio in the scanning direction can be adjusted by changing the ratio of rotating speed of the photosensitive drum 20 to the scanning speed, i.e., the moving speed of the exposure lamp 14 and the mirror 15. Further, a magnification ratio in the direction normal to the scanning direction can be adjusted by changing the ratio of the optical path length from the lens 18 to the drum surface to the optical path length from the document 0 to the lens 18.

This fact implies that the magnification ratio in the direction normal to the scanning direction can be changed by properly moving the mirrors 16 and 17 and the lens 18.

Figure 3:
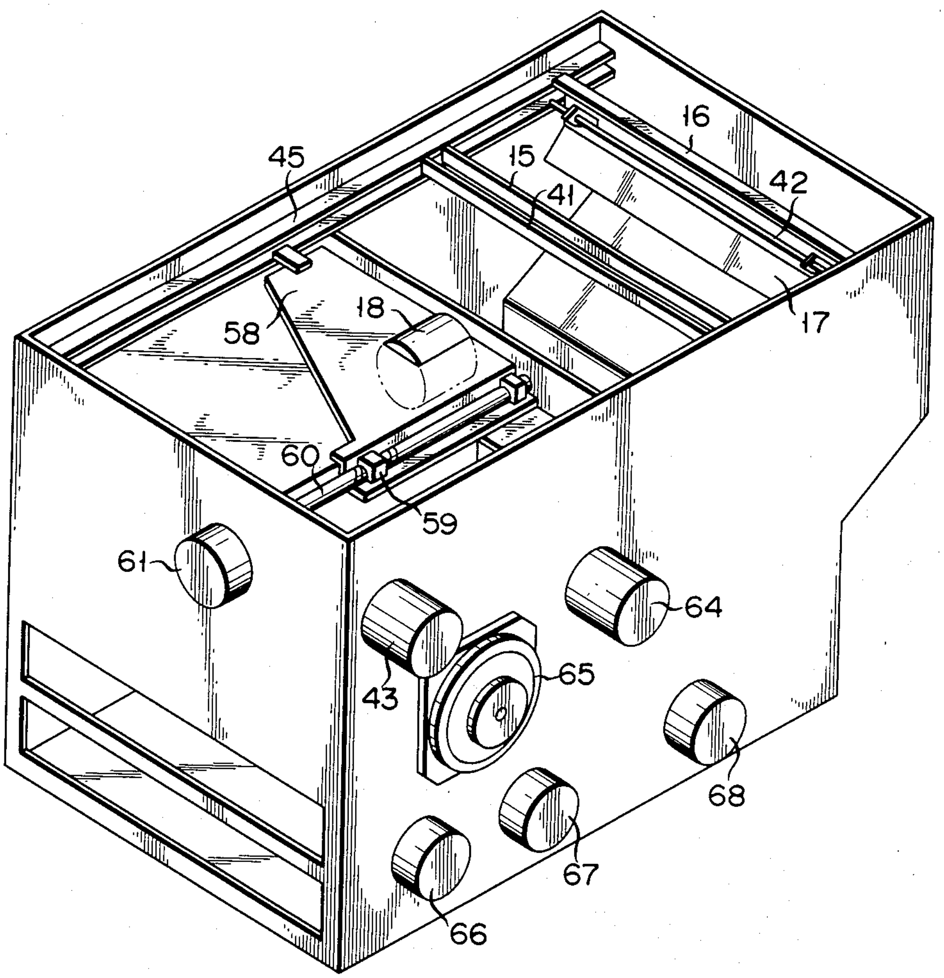
FIG. 3 is a perspective view of the copying apparatus shown in FIG. 2 in which a document supporting table is removed.
Figure 4:
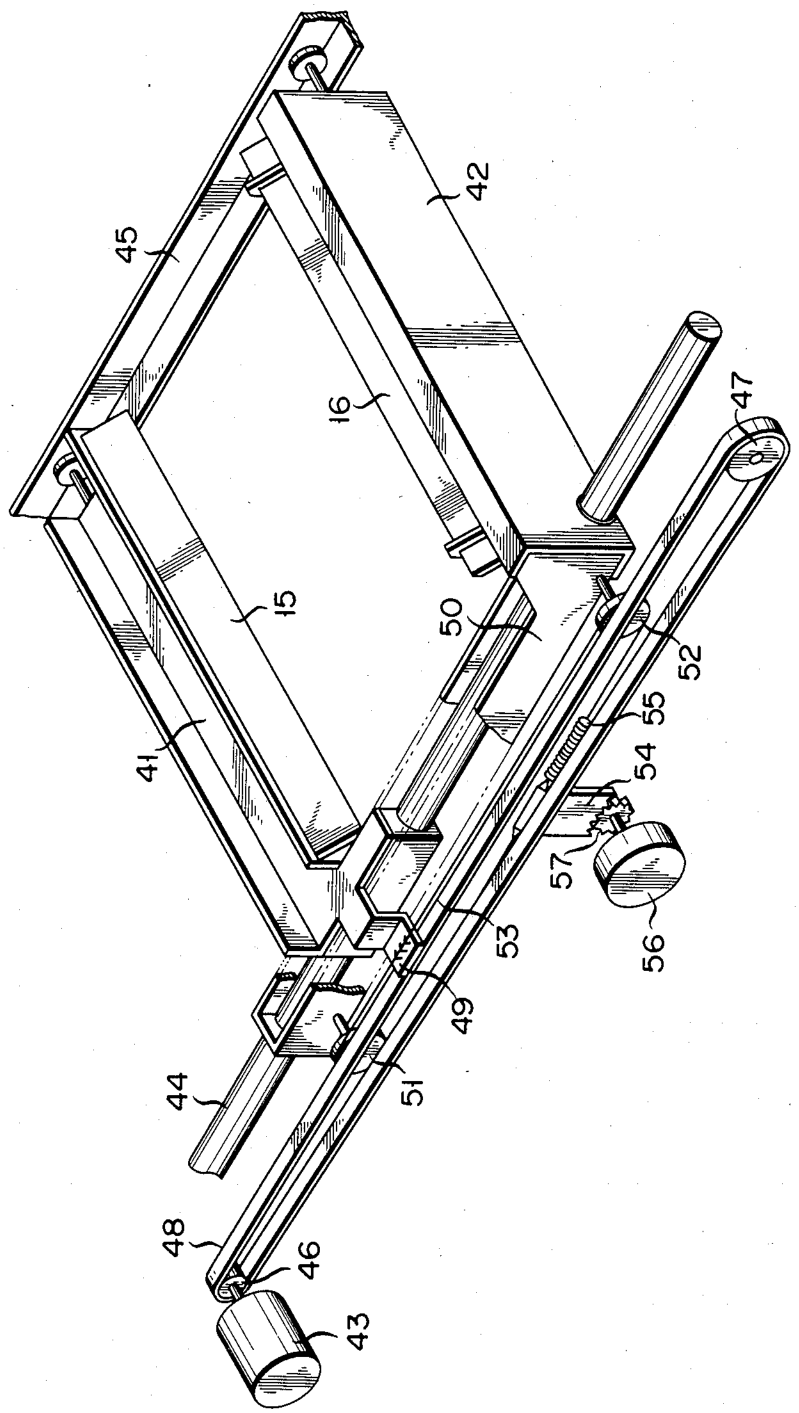
FIG. 4 is a perspective view illustrating a moving mechanism for an optical system shown in FIGS. 2 and 3.

A control mechanism for changing the speed ratio and the optical path length ratio, according to the present invention, will be given referring to FIGS. 3–5. In FIG. 3, the exposure lamp and the mirror 15 are fixed to a first carriage 41. Similarly, the mirrors 16 and 17 are fixed to a second carriage 42. A scanning motor 43 drives the first and second carriages 41 and 42 through a mechanism which is operated in such a manner that the second carriage 42 moves at half the speed of the first carriage 41. As shown in FIG. 4, the first and second carriages 41 and 42 are reciprocately moved along a guide shaft 44 and a guide rail 45. A drive pulley 46 driven by the scanning motor 43 is provided near one end of the guide shaft 44 and a follower pulley 47 is provided near the other end of the guide shaft 44. An endless belt 48 with teeth is wound between the pulleys 46 and 47. The endless belt 48 is fixed at one point to a projection 49 of the first carriage 41.

A shaft support 50 for supporting the guide shaft 44 has a pair of pulleys 51 and 52 rotatably provided thereto. A wire 53 is wound between those pulleys 51 and 52. The wire 53 is directly fixed at one end to a fixing member 54 with a rack at the bottom end, as viewed in the drawing, and fixed at the other end through a coiled spring 55 to the same fixing member 54. With this structure, the pulleys 51 and 52 serve as a movable pulley pair so that the second carriage 42 moves at half the speed of the first carriage 41. A mirror moving motor 56 has a pinion 57 at one end of the drive shaft thereof, which mates with the rack of the fixing member 54. The motor 56 thus coupled with the fixing member 54 can be driven to move only the second carriage 42 to which the mirrors 16 and 17 are provided.

Figure 5:
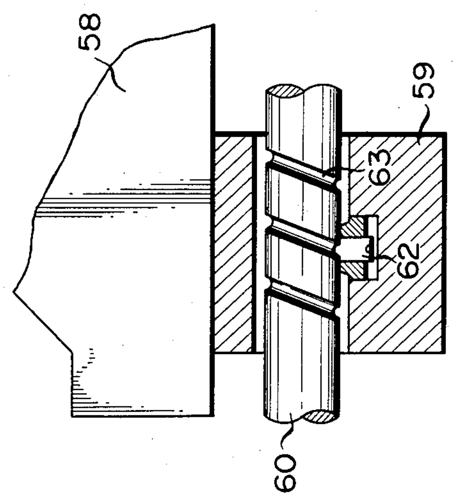
FIG. 5 is a view illustrating a moving mechanism for a lens block.

As shown in FIGS. 3 and 5, the lens 18 is held by a lens block 58. The lens block 58 is coupled with a cam shaft 60 through a cam follower section 59 fixed to the block 58. The cam shaft 60 is driven by a lens moving motor 61 such as a reversible motor, to move the lens. The lens block 58 progresses or regresses according to the rotational direction of the motor 61. Independent of the movement of the lens block 58, the second carriage 42 moves to change the optical path length ratio. As well illustrated in FIG. 5, a cam follower 62, fitted to the cam follower section 59, moves along a groove spirally formed around the cam shaft 60 to move the entire lens block 58.

The motors for driving the photosensitive drum 20, the scanning device, the mirror, and the lens, designated respectively by 64, 43, 56 (FIG. 4), and 61 and arranged as shown in FIG. 3, are independently controlled pulse motors. Further, motors 65–68 are respectively for driving the developer 22, paper feed rollers 25 and 26, the pair of registration rollers 29, and the paper transport path 35, the pair of heat rollers 36, the paper exit or discharge roller 37. The motors 65 and 68 are brushless motors. The motors 66 and 67 are pulse motors.

Figure 6:
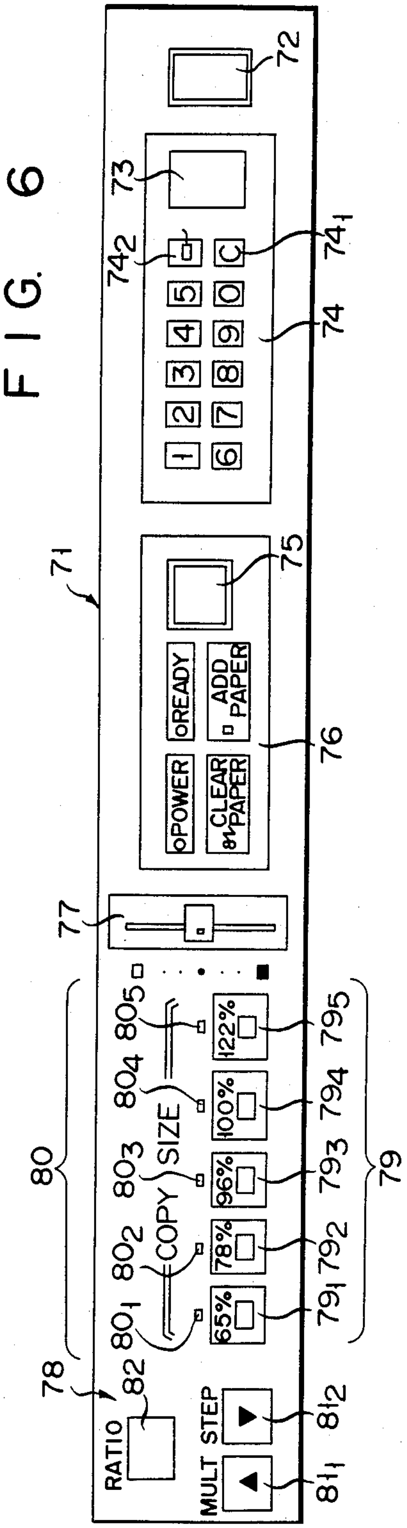
FIG. 6 shows an operation panel of the copying apparatus of FIG. 2.

An operation panel description will be given referring to FIG. 6. As shown, an operation panel 71 for operator guidance is provided with many keys of the touch sensor type, for example, and indicators for operations and controls of the copying apparatus. A power switch 72 turns on and off the main supply to the copying apparatus. A start key 73 starts the copying operation. Ten keys 74 are for setting the desired number of copies. A clear key $74_1$ clears an erroneous setting of the number of copies. An interrupt key $74_2$ is used for effecting a copy run interrupt. A condition indicator section 76 indicates operating conditions of the copying apparatus. A density adjustor 77 adjusts the copying density. A magnification ratio setting area 78 for setting a copying magnification ratio is provided on the left side of the panel area containing the above mentioned keys and indicators.

The magnification ratio setting area 78 is made of first and second MR (magnification ratio) setting sections and first and second indicator sections. The first MR setting section 79 contains setting keys $79_1$–$79_5$ for selectively setting five specified magnification ratios 65%, 78%, 96%, 100% and 122%, respectively. The second MR setting section contains a magnification ratio increasing key $81_1$ and a magnification ratio decreasing key $81_2$, each key being for setting a desired magnification ratio. The first indicator section 80 contains indicator lamps $80_1$–$80_5$, respectively associated with correspondingly located just above the keys $79_1$–$79_5$. For example, when a magnification ratio of 65% is selected by the key $79_1$, its associated lamp $80_1$ lights to indicate the selection of 65% magnification ratio. The second indicator section 82 indicates by a numeral number a magnification ratio set by operating the keys $79_1$–$79_5$. The operation of the first and second indicators follows. So long as neither second MR setting key $81_1$ or $81_2$ is pushed, the second indicator section 82 displays a numeral representing a magnification ratio as specified by one of the ratio setting keys $79_1$–$79_5$ and indicated by the corresponding lamp. When one of the keys $81_1$ and $81_2$ is pushed to change a magnification ratio, the second indicator section 82 dynamically displays increasing or decreasing changes in the magnification ratios by changing the numerals representing the same. The key operation in the second MR setting section is continued until a desired magnification ratio is reached. When one of the specified magnification ratios in the first indicator section 80 is displayed on the second indicator section 82 during the magnifications ratio changing, the lamp representing the specified magnification ratio is energized. For getting a desired magnification ratio, two ways are allowed. The first way is useful when one of the MR setting keys $79_1$–$79_5$ is already pushed to set a specified magnification ratio and another magnification ratio which is not specified is desired. In this case, one of the keys $81_1$ and $81_2$ is properly selected. Then, the selected key is continuously pushed until the second indicator section 82 displays a numeral representing the desired magnification ratio. In the second way, any of the MR ratio setting keys $79_1$–$79_5$ is not pushed and the ratio increasing key $81_1$ or the ratio decreasing key $81_2$ is operated. When the first MR setting sections is not operated a magnification ratio of 100% is automatically set. When either of the keys $81_1$ and $81_2$ is continuously operated within one second, for example, a magnification ratio may be changed by 0.01 (1%). When its pushing continues for more than one second, the magnification ratio may be changed by 0.1 (10%) every second.

Figure 7:
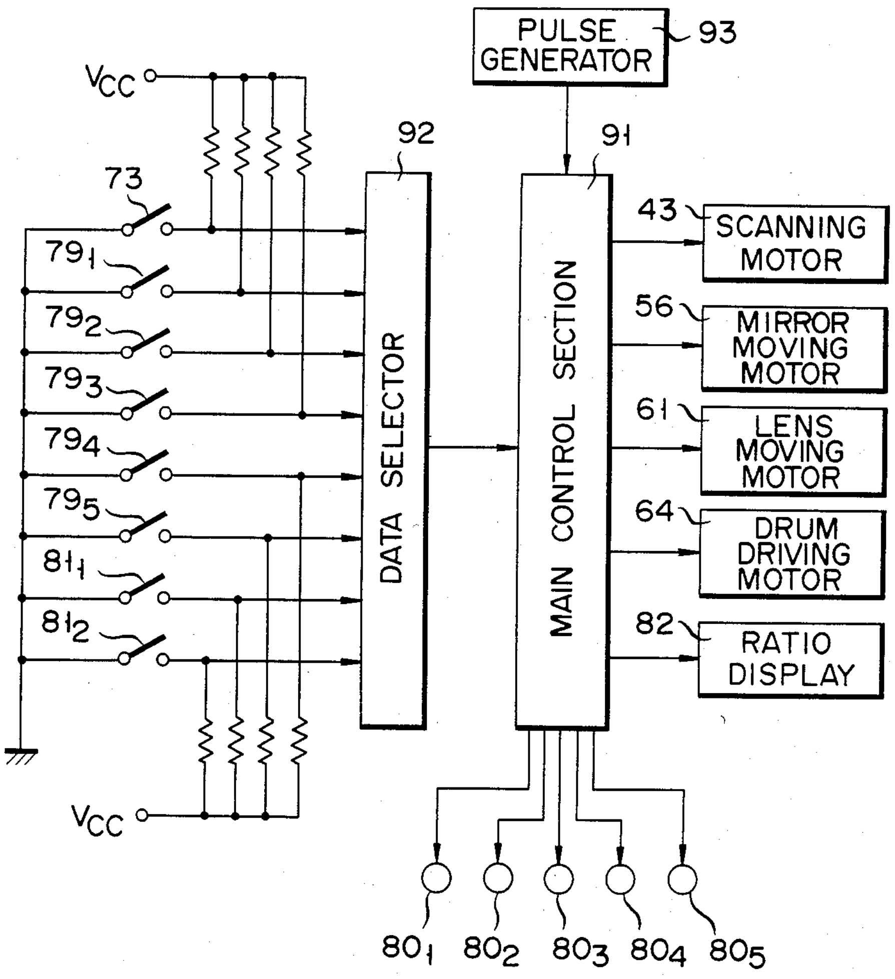
FIG. 7 shows a functional diagram of a part of a control section of the copying apparatus of FIG. 2.

Turning now to FIG. 7, there is shown in block form a control section of a copying apparatus according to the present invention. A main control section 91 contains a CPU (central processing unit) and its peripheral circuit, and controls the entire copying apparatus. A data selector 92 is electrically coupled with the start key 73, the MR setting keys $79_1$–$79_5$, and the MR increasing and decreasing keys $81_1$ and $81_2$. The data selector 92 receives data keyed in by those keys and transfers it to the main control section 91. The main control section 91 is connected at the output side to the scanning motor 43, the mirror moving motor 56, the lens moving motor 61, the drum driving motor 64, the indicator lamps $80_1$–$80_5$, and the second indicator section 82 or the magnification ratio display section. The main control section 91 is connected at the input side to a pulse generator 93 which supplies a pulse periodically to the pulse motors 43, 56 and 61, and 64. The pulse is also used to periodically sense the ON/OFF state of the power switch 72, the start key 73, the MR setting keys $79_1$–$79_5$, and the MR increasing and decreasing keys $81_1$ and $81_2$. According to the results of sensing the operational state of those keys, the main control section 91 updates the display data for the indicator lamps $80_1$–$80_5$ and the magnification ratio display section 82, while at the same time controls the mirror moving motor 56 and the lens moving motor 61. Upon depression of the start key 73, the main control section 91 operates the scanning motor 43 and the drum driving motor 64 to start the copying operation.

Figure 8A:
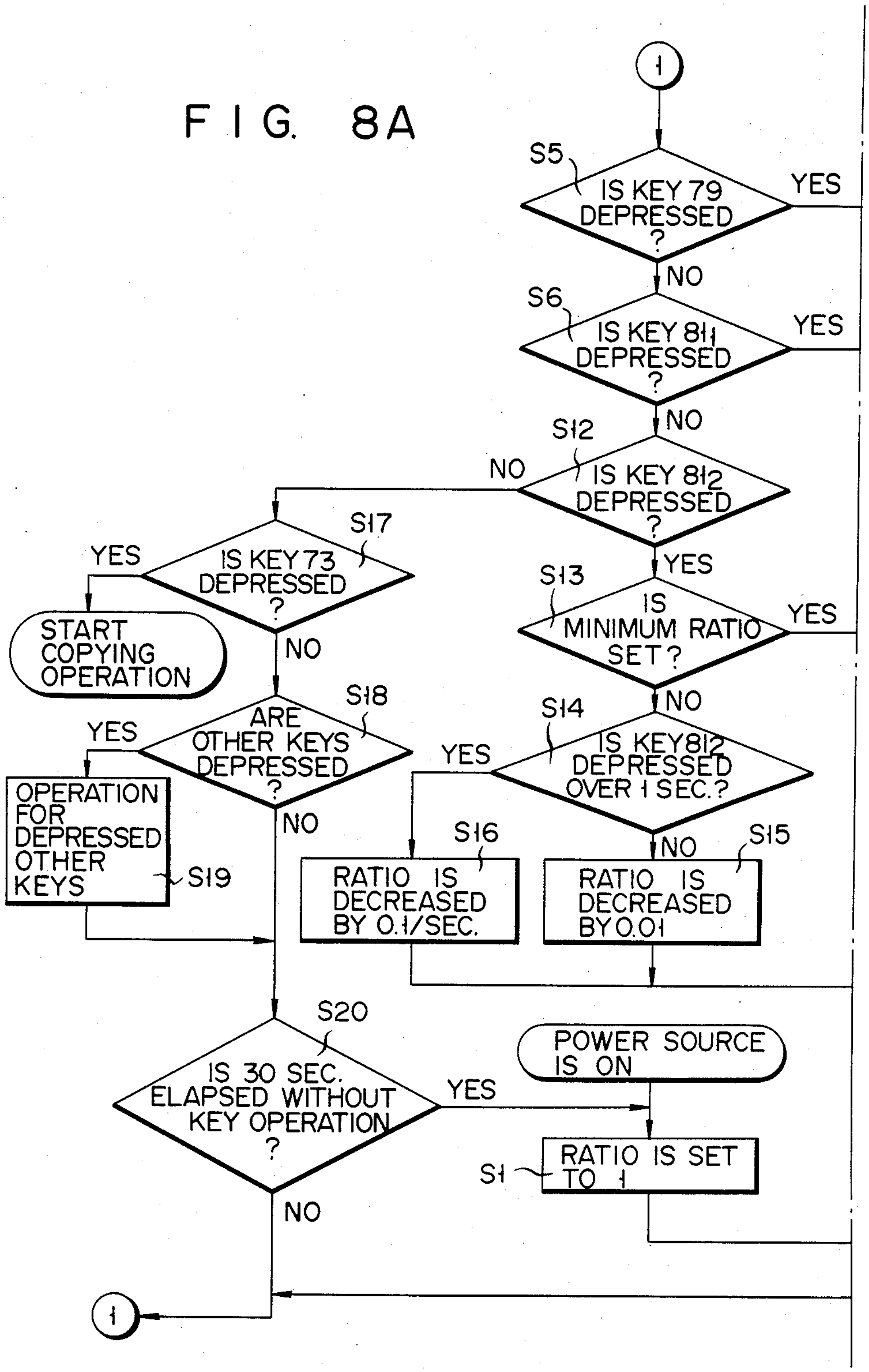
FIGS. 8A, 8B show a flow chart useful in explaining the controlling operation of a magnification ratio in the copying apparatus of FIG. 2.
Figure 8B:
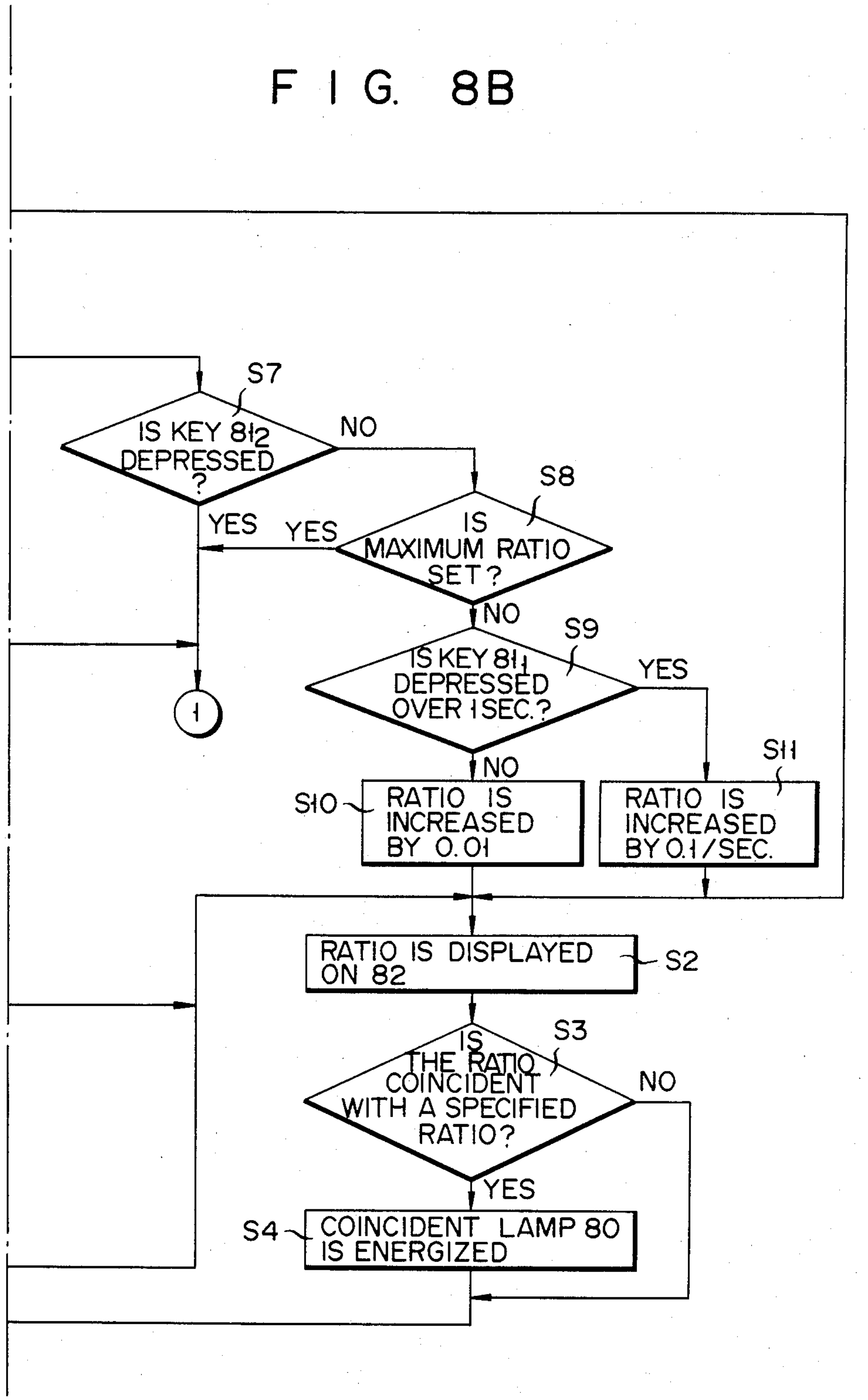

The operation of the copying apparatus will be given referring to a flow chart shown in FIGS. 8A, 8B. When the power source is turned on, step S1 is executed where a magnification ratio is automatically set to 1 (100%). Then step S2 is followed. In step S2, the 100% MR is displayed on the second indicator section 82. In step S3 following step S2, it is checked whether or not the 100% MR is equal to a specified magnification ratio, which is one of the predetermined MRs 65%, 78%, 96%, 100% and 122% in this embodiment. If those are equal (YES), the operation advances to step S4. In this step S4, the lamp $80_4$ representing the 100% MR lights up. Then, the operation goes to next step S5. If the MRs are not coincident with each other in step S3 (NO), the operation jumps to step S5. In step S5, it is checked whether or not one of the MR setting keys $79_1$–$79_5$ is already pushed. If it is pushed (YES), the operation returns to step S2. And, the above operation is repeated.

In summary, upon turning on the power source, the MR is automatically set to 100% and the 100% MR is indicated on the second indicator section 82. When one of the specified MR setting keys $79_1$–$79_5$ has been pushed, the lamp associated with the pushed key lights up to indicate that a specific MR has been selected. At the same time, the second indicator section 82 presents the number of the selected MR.

If the results of checking are NO in step S5, the operation goes to step S6. This step S6 is for checking whether or not the MR increasing key $81_1$ has been pushed. If the result is YES, step S7 is executed. Step S7 is for checking whether or not the keys $81_2$ and $81_1$, have been pushed at the same time. If they have been pushed (YES), the operation returns to step S5. Then, the above operation is repeated. If the results of the check in step S7 is NO, step 8 is executed. In this step S8, it is checked whether or not the maximum MR, which is the upper limit of MR in this copying apparatus, has already been set. If it is set (YES), the operation returns to step S5. Then, the above operation is repeated. On the other hand, if it is not set in step S8 (NO), the operation goes to step S9. In this step S9, it is checked to see if the MR increasing key $81_1$ pushing has continued for more than one second (first predetermined period of time) or not. If it is less than one second (NO), step S10 is executed. In this step S10, the MR is increased by 0.01 (1%). Then, the operation goes back to step S2 and a repeat of the above operation from the step 2 to some succeeding steps is done. In step S9, if the pushed state of the MR increasing key $81_1$ continues for more than one second (YES), the operation advances to step S11. In step S11, the MR is increased by 0.1 (10%) every one second. Then, step S2 is again executed and the above operation is repeated. In step S6, if the MR increasing key $81_1$ is not pushed (NO), the operation goes to step S12. In this step S12, it is checked to see if the MR decreasing key $81_2$ has been pushed. If the key $81_2$ has been pushed (YES), the next step S13 is executed. Step S13 checks if the minimum MR, which is the lower limit of MR in the copying apparatus, has already been set. If the result is YES, step S5 is again executed and the related steps following step S5 are executed as in the above manner. If the result is NO in step (S13), step S14 is executed. In this step S14, it is checked if the MR decreasing key $81_2$ has been continuously pushed for more than a second predetermined period of time, e.g., one second predetermined period of time equal to the first predetermined period of time above. If its continuation is not over one second (NO), step S15 is then executed. In this step S15, the MR is decreased by 0.01 (1%). Then, the operation goes back to step S2, and the above operation beginning at this step is repeated. If the pushing of the MR decreasing key $81_2$ continues over one second (YES) in step S15, step S16 is executed to decrease the MR by 10%/second. Then, the operation returns to step S2 to execute the above operation begining at step S2.

In brief, the present MR is currently displayed on the second indicator or the MR display section 82. If a further increase in the present MR is desired, the MR increasing key $81_1$ is operated. For the reverse case, the MR decreasing key $81_2$ is operated. The continuity of pushing the key $81_1$ or $81_2$ within one second increases or decreases MR by the practically the minimum or the unit amount of MR, for example, 0.01 (1%). The resultant MR is displayed in the MR display section 82. If the key operation continuity is over one second, the MR is increased or decreased at a given rate, for example, 10%/second, and the result is displayed.

Every time the displayed numerical value on the MR display section 82 coincides with one of the five MRs 65%, 78%, 96%, 100% and 122%, the lamp $80_1$–$80_5$ of those associated with the coincident MR lights up. A numeral value displayed on the MR display section 82 as the MR increasing key or decreasing key $81_1$ or $81_2$ is released from its pushing state, indicates that the MR is now set in the copying apparatus. As seen from the foregoing description, the specified MR may be set by one of the MR setting keys $79_1$–$79_5$. The MR may also be set to any desired value by using only one of the MR increasing and decreasing keys $81_1$ and $81_2$. Additionally, it may be set to any desired value by properly operating those keys $79_1$–$79_5$ and $81_1$ and $81_2$ in a combined manner.

In step S12, when the MR decreasing key $81_2$ is not depressed (NO), the operation advances to step S17. This step S17 is provided for checking to see if the start key 73 has been actuated. If it is not actuated (NO), step S18 is executed. In this step S18, it is checked to see if any other key on the operation panel 71 is despressed. If it is depressed (YES), the operation goes to step S19. In this step S19, processing for the depressed key is performed. Then, the next step S20 is executed. In step S18, if the check result is NO, the execution jumps to step 20. In step S20, it is checked to see if the "no key operation" on the operation panel 71 continues for a given period of time (for example, 30 seconds) or more. If such a state continues for less than 30 seconds (NO), the operation returns to step S5. And the operation succeeding step S5 is repeated. If the result is YES, step S1 and the succeeding steps are executed.

In brief, if the start key 73 is not operated within 30 seconds (in this embodiment) after the MR setting operation or the copying operation ends, the MR is automatically returned to 100%.

In step S17, if the copy start key 73 is pushed (YES), the copying operation is performed at the selected MR. More specifically, at the end of the MR setting, the main control section 91 drives the mirror moving motor 56 (FIG. 4) and the lens moving motor 61 (FIG. 3) in order to change the MR in a direction normal to the scanning direction. With the rotation of the motors, the second carriage 42 having the mirrors 16 and 17 and the lens block 58 having the lens 18 are moved, so that the ratio of the optical path from the lens 18 to the photosensitive drum 20 with respect to the optical path length from the document 0 to the lens 18 takes a value corresponding to the selected MR. In this case, the minimum or maximum optical path length is determined by a physical dimension of the copying apparatus. Further, the same lens 18 is always used. Therefore, the lens 18 may be positioned so as to satisfy the selected MR. If the copying apparatus is designed so that a CPU is used for the main control section 91 and pulse motors are used for the mirror moving motor 56 and the lens moving motor 61, the movement of the mirrors and the lens may accurately be controlled by counting the number of pulses applied to the pulse motors. Then, the lens 18 may also be set at an accurate position.

In the copying apparatus operation, a desired MR is set and a desired number of copies are set. Then, the start key 73 is pushed. Upon this, the main control section 91 drives the scanning motor 43 and the drum driving motor 64. In turn, the document 0 set on the document supporting table 12 is optically scanned, and a latent image is formed on the drum surface. Then, the copying apparatus proceeds with the succeeding operation as mentioned above. As already mentioned, the MR in the scanning direction is determined by the ratio of the rotating speed of the photosensitive drum 20 to the moving speed of the first carriage 41 having the exposure lamp 14 and the mirror 15. In this embodiment, the scanning motor 43 is provided for the movement of the first carriage 41. Further, another motor, i.e., the drum driving motor 64, is provided for the rotation of the photosensitive drum 20. With this arrangement, the speed ratio may be controlled so as to correspond to the selected MR. Since the pulse motors are used for the motors 43 and 64, the speed ratio may easily and accurately be made to correspond to the set MR by counting pulses applied to those motors.

In the above-mentioned embodiment, the optical length ratio is changed by moving the mirrors 16 and 17 and the lens 18. Alternatively, a plurality of lenses may be provided and a lens corresponding to the set MR may be selected from those lenses. In another modification, a compensating lens may be used for covering the lens 18 to change the focal point of the lens 18 and then the mirrors 16 and 17 and the lens 18 may be moved. The modifications have the possibility that the copying apparatus is reduced in size or the MR is set within a much wider range. The speed ratio may be adjusted in a manner that only the scanning speed is changed, while the rotating speed is fixed. A zoom lens mechanism may be employed for the MR change.

It should be understood that the present invention is applicable for any other image forming apparatus including a means for optically scanning a document, a means for controlling the MR of an optical image obtained by the scanning, and a means for forming an MR adjusted image on the photosensitive medium.

What is claimed is:

1. An image forming apparatus comprising:

an optical means for optically scanning a document and transmitting light beams from said document so as to form an optical image of said document;

magnification ratio setting means for setting a magnification ratio in size of said optical image with respect to said document; and control means for controlling said optical means in such a manner that said optical image with said magnification ratio set by said magnification ratio setting means is projected on a photosensitive means;

wherein said magnification ratio setting means comprises a first magnification ratio setting means which includes at least one magnification ratio setting key for setting a specified magnification ratio, and a second magnification ratio setting means which includes a magnification ratio increasing key and a magnification ratio decreasing key;

when said magnification ratio increasing key or said magnification ratio decreasing key is operated continuously within a first period of time, said magnification ratio is increased or decreased by a first predetermined value of the magnification ratio, and when said magnification ratio increasing or decreasing key is operated continuously over said first period of time, said magnification ratio is increased or decreased by a second predetermined value of magnification ratio each unit time exceeding said first period of time; and said control means controls said optical means in such a manner that an optical image having a magnification ratio set by using said first magnification ratio setting means, by using said second magnification ratio setting means or by using said first and second magnification ratio setting means, is projected on said photosensitive medium.

2. An image forming apparatus according to claim 1, wherein said first magnification ratio setting means includes a plurality of magnification ratio setting keys and a plurality of pilot lamps provided corresponding to said magnification ratio setting keys, the pilot lamp corresponding to a setting key by which a magnification ratio is set being energized; and said second magnification ratio setting means includes a magnification ratio indicator which indicates by numerals the magnification ratio set by said first or second magnification ratio setting means.

3. An image forming apparatus according to claim 2, wherein when said magnification ratio indicator indicates one of the specified magnification ratios corresponding to said magnification ratio setting keys, the pilot lamp corresponding to the specific ratio indicated by said magnification ratio indicator is energized.

* * * * *

US004641953B1

REEXAMINATION CERTIFICATE (3535th)

United States Patent [19]

[11] B1 4,641,953

Oushiden et al.

[45] Certificate Issued Jun. 9, 1998

[54] IMAGE FORMING APPARATUS WITH MAGNIFICATION RATIO SETTING

[75] Inventors: Hideshi Oushiden, Kawasaki; Naoshi Obara, Yokohama, both of Japan

[73] Assignee: Kabushiki Kaisha Toshiba, Kawasaki, Japan

Reexamination Request:

No. 90/004,065, Dec. 8, 1995

Reexamination Certificate for:

| | |
|---|---|
| Patent No.: | **4,641,953** |
| Issued: | **Feb. 10, 1987** |
| Appl. No.: | **615,278** |
| Filed: | **May 30, 1984** |

[30] Foreign Application Priority Data

May 31, 1983 [JP] Japan .................................... 58-96124

[51] Int. Cl.$^6$ ............................ G03L 15/00; G03B 27/52

[52] U.S. Cl. ......................... 399/197; 250/201.7; 355/55; 355/57; 399/81

[58] Field of Search .................................... 399/196, 197, 399/81; 355/55, 57, 56

[56] References Cited

U.S. PATENT DOCUMENTS 4,543,643 9/1985 Shibazaki et al. ......................... 355/55
4,646,330 2/1987 Sugiura et al. ........................... 377/15

FOREIGN PATENT DOCUMENTS 2 070 816 9/1981 United Kingdom .

OTHER PUBLICATIONS

Potterton EP2000 Electronic Programmer.

*Primary Examiner*—Joan Pendegrass

[57] ABSTRACT

A copying apparatus comprises specified magnification ratio setting keys for setting specified magnification ratios and magnification ratio increasing and decreasing keys for setting a desired magnification ratio. The magnification ratio is defined as the ratio in size of the copied image with respect to the document to be copied.

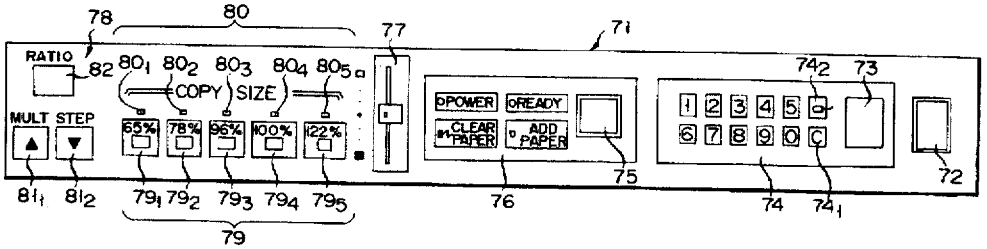

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 3 are cancelled.

New claim 4 is added and determined to be patentable.

*4. An image forming apparatus comprising:*

*an optical means for optically scanning a document and transmitting light beams from said document so as to form an optical image of said document;*

*magnification ratio setting means for setting a magnification ratio in size of said optical image with respect to said document; and*

*control means for controlling said optical means in such a manner that said optical image with said magnification ratio set by said magnification ratio setting means is projected on a photosensitive means;*

*wherein said magnification ratio setting means comprises a first magnification ratio setting means which includes at least one magnification ratio setting key for setting a specified magnification ratio, and a second magnification ratio setting means which includes a magnification ratio increasing key and a magnification ratio decreasing key;*

*when said magnification ratio increasing key or said magnification ratio decreasing key is operated continuously within a first period of time after a first magnification ratio is set by the first magnification ratio setting means, said magnification ratio is increased or decreased from the first magnification ratio by a first predetermined value of the magnification ratio, and when said magnification ratio increasing or decreasing key is operated continuously over said first period of time after the first magnification ratio is set by the first magnification ratio setting means, said magnification ratio is increased or decreased from a second magnification ratio, increased or decreased from the first magnification ratio during the first period of time, by a second predetermined value of magnification ratio each unit time exceeding said first period of time, said second predetermined value of magnification ratio being larger than said first predetermined value of magnification ratio; and*

*said control means controls said optical means in such a manner that an optical image having a magnification ratio set by using said first magnification ratio setting means, by using said second magnification ratio setting means or by using said first and second magnification ratio setting means, is projected on said photosensitive medium.*

* * * * *